US010656245B2

(12) United States Patent
Zelený et al.

(10) Patent No.: US 10,656,245 B2
(45) Date of Patent: May 19, 2020

(54) AUTOMOTIVE RADAR SENSOR BLOCKAGE DETECTION USING ADAPTIVE OVERLAPPING VISIBILITY

(71) Applicant: Valeo Radar Systems, Inc., Hudson, NH (US)

(72) Inventors: Jan Zelený, Lety (CZ); Dan Busuioc, Brookline, MA (US); Jeffrey Millar, Mount Vernon, NH (US); Tomas Vajdiak, Horovice (CZ)

(73) Assignee: VALEO RADAR SYSTEMS, INC., Hudson, NH (US)

( * ) Notice: Subject to any disclaimer, the term of this patent is extended or adjusted under 35 U.S.C. 154(b) by 260 days.

(21) Appl. No.: 15/695,371

(22) Filed: Sep. 5, 2017

(65) Prior Publication Data

US 2019/0072646 A1     Mar. 7, 2019

(51) Int. Cl.
*G01S 7/40*        (2006.01)
*G01S 13/66*     (2006.01)
(Continued)

(52) U.S. Cl.
CPC .......... *G01S 7/4004* (2013.01); *G01S 7/4026* (2013.01); *G01S 13/66* (2013.01); *G01S 13/878* (2013.01);
(Continued)

(58) Field of Classification Search
CPC ..... G01S 7/4004; G01S 7/4026; G01S 13/878
(Continued)

(56) References Cited

U.S. PATENT DOCUMENTS 5,959,570 A    9/1999 Russell
6,469,659 B1   10/2002 Lajiness et al.
(Continued)

FOREIGN PATENT DOCUMENTS

DE        10149115 A1     4/2003
DE     102005013146 A1     9/2006
DE     102016103203 A1     8/2017

OTHER PUBLICATIONS

U.S. Appl. No. 15/072,678, filed Mar. 17, 2016, Millar et al.
(Continued)

*Primary Examiner* — Bo Fan
(74) *Attorney, Agent, or Firm* — Daly, Crowley, Mofford & Durkee, LLP (57) ABSTRACT

A blockage detection system and methods for use in a radar sensor such as a side object detection (SOD) sensor in an automotive radar system are described. The blockage detection system and method operate in systems including two or more radar sensors having overlapping field-of-views (FOVs). The blockage detection system includes a storage in a first radar sensor having stored therein a tracked object list including detections/tracks for one or more targets made by a second radar sensor and a processor for adjusting an overlap zone associated with the first radar sensor based upon an estimated mounting angle of the first radar sensor. The system further includes a processor coupled to the storage and processor configured to identify one or more relevant detections/tracks from the tracked object list using the adjusted overlap zone and a blockage detection processor configured to receive the relevant detections/tracks from said processor and configured to compare the relevant detections/tracks to detections/tracks for one or more targets made by the first radar sensor.

12 Claims, 7 Drawing Sheets

(51) Int. Cl.
*G01S 13/931* (2020.01)
*G01S 13/87* (2006.01)
*G01S 7/295* (2006.01)

(52) U.S. Cl.
CPC .............. *G01S 13/931* (2013.01); *G01S 7/295* (2013.01); *G01S 7/2955* (2013.01); *G01S 2007/403* (2013.01); *G01S 2007/4039* (2013.01)

(58) Field of Classification Search
USPC .......................................................... 342/26
See application file for complete search history.

(56) References Cited

U.S. PATENT DOCUMENTS

| | | | |
|---|---|---|---|
| 6,611,227 | B1 | 8/2003 | Nebiyeloul-Kifle et al. |
| 7,973,701 | B2 | 7/2011 | Lohmeier et al. |
| 2002/0147534 | A1 | 10/2002 | Delcheccolo et al. |
| 2013/0015999 | A1 | 1/2013 | Alland |
| 2014/0142800 | A1* | 5/2014 | Zeng ..................... G01S 13/931 701/30.6 |
| 2015/0070207 | A1 | 3/2015 | Millar et al. |
| 2017/0059695 | A1 | 3/2017 | Fetterman et al. |

OTHER PUBLICATIONS

PCT International Search Report of the ISA dated Jun. 16, 2017 for International Appl. No. PCT/US2017/021338; 5 pages.
PCT International Written Opinion of the ISA dated Jun. 16, 2017 for International Appl. No. PCT/US2017/021338; 8 pages.
Non-Final Office Action dated Jul. 13, 2018 for U.S. Appl. No. 15/072,678; 12 pages.
PCT International Search Report dated Oct. 24, 2018, for Application No. PCT/US2018/044523; 6 Pages.
PCT Written Opinion of the International Searching Authority dated Oct. 24, 2018, for Application No. PCT/US2018/044523; 9 Pages.
Response to U.S. Non-Final Office Action dated Jul. 13, 2018, for U.S. Appl. No. 15/072,678; Response filed on Oct. 1, 2018; 8 Pages.
Notice of Allowance dated Oct. 31, 2018, for U.S. Appl. No. 15/072,678; 9 Pages.
PCT International Preliminary Report on Patentability dated Sep. 27, 2018 for Application No. PCT/US2017/021338; 8 Pages.

* cited by examiner

AUTOMOTIVE RADAR SENSOR BLOCKAGE DETECTION USING ADAPTIVE OVERLAPPING VISIBILITY

BACKGROUND

As is known in the art, radar sensors are increasingly being used within automobiles and other vehicles to provide information to drivers about target structures and vehicles in a vicinity of the automobiles. Radar sensors may be programmed to perform functions such as blind spot detection (BSD), lane change assist (LCA), cross traffic alert (CTA), and others to enhance safety and driver awareness on the road.

The existence of foreign matter or objects on a radar such as an automotive radar sensor can impact the accuracy and reliability of the radar. For example, the foreign matter or objects may undesirably block one or more portions of the radar sensor transmit and/or receive antennas and, in particular, may block portions of the RF energy propagating to and from the transmit and receive antennas of the radar sensor. Such blockage may be the result of an accumulation of foreign matter or objects in the region of an antenna aperture. One existing technique for detecting blockages involves using multiple radar sensors having overlapping field-of-view (FOVs).

SUMMARY

In accordance with the concepts, systems and techniques described herein, it has been appreciated that existing techniques for detecting blockages in an automotive radar sensor based on overlapping sensor field-of-view (FOVs) may generate false blockage detections/alerts if one or more of the sensors are misaligned (e.g., if a sensor's mounting angle on the vehicle is different from its intended or designed mounting angle). Sensor misalignment may be due to a collision or other impact to the vehicle, for example, in the area about the radar sensor. Sensor misalignment may also be attributed to installation of a sensor in a vehicle (i.e. the sensor is misaligned when it is installed). Accordingly, there is a need for an improved blockage detection technique that adapts to sensor misalignment to reduce (and ideally eliminate) false blockage detection/alerts.

In accordance with a first aspect of the concepts, systems and methods described herein, a blockage detection method includes receiving, at a first radar sensor, a tracked object list including detections/tracks for one or more targets made by a second radar sensor, determining a mounting angle of the first radar sensor, adjusting (or adapting) an overlap zone associated with the first radar sensor based on the determined mounting angle of the first radar sensor and identifying one or more relevant detections/tracks from the tracked object list using the adjusted overlap zone.

With this particular arrangement, a method for blockage detection is provided. By comparing the relevant detections/tracks to detections/tracks for one or more targets made by the first radar sensor a determination as to whether a blockage exists can be made. In embodiments, adjusting one or more overlap zones may be performed adaptively so that overlap zones are substantially continuously covered an antenna radiation pattern (radar sight) of a radar sensor.

In embodiments, determining a mounting angle of the first radar sensor may be accomplished by determining an estimated mounting angle of the first radar sensor.

In embodiments, the determining a mounting angle of the first radar sensor can be determining an estimated mounting angle of the first radar sensor.

In embodiments, determining an estimated mounting angle of the first radar sensor can be accomplished using an auto-alignment process. By bringing the result of auto-alignment function as an input parameter to be used during a process for determining whether a blockage exists (i.e. using the result of auto-alignment function as an input parameter to a blockage function), an improved blockage detection technique that adapts to sensor misalignment to reduce (and ideally eliminate) false blockage detection/alerts is provided.

In embodiments, adjusting an overlap zone associated with the first radar sensor based on the mounting angle of the first radar sensor may include adjusting an overlap zone associated with the first radar sensor based on an estimated mounting angle of the first radar sensor.

In accordance with a first aspect of the concepts, systems and methods described herein, a method for detecting blockages in an automotive radar system having two or more radar sensors with overlapping field-of-views (FOVs), includes: receiving, at a first radar sensor, a tracked object list including detections/tracks for one or more targets made by a second radar sensor; determining an estimated mounting angle of the first radar sensor using an auto-alignment process; adjusting an overlap zone associated with the first radar sensor based on the estimated mounting angle of the first radar sensor; identifying one or more relevant detections/tracks from the tracked object list using the adjusted overlap zone; and performing blockage detection by comparing the relevant detections/tracks to detections/tracks for one or more targets made by the first radar sensor.

The method may include one or more of the following features independently or in combination with another feature including but not limited to: determining a mounting angle of the first radar sensor may include determining an estimated mounting angle of the first radar sensor using an auto-alignment process; synchronizing the tracked object list with the first radar sensor; synchronizing the tracked object list with the first radar sensor including adjusting detections/tracks within the tracked object list based on a time difference between the first sensor and the second sensor; synchronizing the tracked object list with the first radar sensor including transforming detections/tracks from a first coordinate system to a second coordinate system; synchronizing the tracked object list with the first radar sensor including transforming detections/tracks from a first coordinate system to a second coordinate system; adjusting the overlap zone including adjusting one or more lateral borders associated with the overlap zone based on the estimated mounting angle of the first radar sensor; identifying one or more relevant detections/tracks from the tracked object list including identifying detections/tracks from the tracked object list that have azimuth angles and ranges associated with the overlap zone; performing blockage detection including performing blockage detection only if the estimated mounting angle of the first radar sensor is greater than a threshold value; performing blockage detection including calculating a detection rate based on the number of relevant detections/tracks from the second radar sensor that are associated with detections/tracks for made by the first radar sensor; and performing blockage detection further includes activating a blockage alert in the first radar sensor if the detection rate is less than a first threshold value and deactivating the blockage alert in the first radar sensor if the detection rate is greater than a second threshold value.

In accordance with a further aspect of the concepts, systems and methods described herein, in an automotive radar system including two or more radar sensors having overlapping field-of-views (FOVs), a blockage detection system includes: means for receiving, at a first radar sensor, a tracked object list including detections/tracks for one or more targets made by a second radar sensor; means for adjusting an overlap zone associated with the first radar sensor based on an estimated mounting angle of the first radar sensor; means for identifying one or more relevant detections/tracks from the tracked object list using the adjusted overlap zone; and means for performing blockage detection by comparing the relevant detections/tracks to detections/tracks for one or more targets made by the first radar sensor.

The apparatus may further include one or more of the following features independently or in combination with another feature including but not limited to: means for synchronizing the tracked object list with the first radar sensor; means synchronizing the tracked object list with the first radar sensor includes means for adjusting detections/tracks within the tracked object list based on a time difference between the first sensor and the second sensor; means for synchronizing the tracked object list with the first radar sensor including means for transforming detections/tracks from a first coordinate system to a second coordinate system; means for synchronizing the tracked object list with the first radar sensor including means for transforming detections/tracks from a first coordinate system to a second coordinate system; means for adjusting the overlap zone including means for adjusting one or more lateral borders associated with the overlap zone based on the estimated mounting angle of the first radar sensor; means for identifying one or more relevant detections/tracks from the tracked object list including means for identifying detections/tracks from the tracked object list that have azimuth angles and ranges associated with the overlap zone; means for performing blockage detection including means for performing blockage detection only if the estimated mounting angle of the first radar sensor is greater than a threshold value; means for performing blockage detection including means for calculating a detection rate based on the number of relevant detections/tracks from the second radar sensor that are associated with detections/tracks for made by the first radar sensor; means for performing blockage detection further including means for activating a blockage alert in the first radar sensor if the detection rate is less than a first threshold value and means for deactivating the blockage alert in the first radar sensor if the detection rate is greater than a second threshold value; and means for determining an estimated mounting angle of the first radar sensor using an auto-alignment process.

In accordance with a still further aspect of the concepts, systems and methods described herein, in an automotive radar system including two or more radar sensors having overlapping field-of-views (FOVs), a blockage detection system includes a storage in a first radar sensor having stored therein a tracked object list including detections/tracks for one or more targets made by a second radar sensor; a processor for adjusting an overlap zone associated with the first radar sensor based upon an estimated mounting angle of the first radar sensor; a processor coupled to said storage, said processor configured to identify one or more relevant detections/tracks from the tracked object list using the adjusted overlap zone; and a blockage detection processor configured to receive the relevant detections/tracks from said processor and configured to compare the relevant detections/tracks to detections/tracks for one or more targets made by the first radar sensor.

The apparatus may further include one or more of the following features independently or in combination with another feature including but not limited to: a blockage detection processor configured to determine a detection rate and in response to a detection rate being less than a first threshold value, the blockage detection processor activates a blockage alert in the first radar sensor and in response to a detection rate being greater than a second threshold value, the blockage detection processor deactivates the blockage alert in the first radar sensor.

In accordance with a still further aspect of the concepts, systems and methods described herein, in an automotive radar sensor, a system and technique for adapting an overlap zone such that the overlap zone is covered by an antenna radiation pattern (radar sight) of the radar sensor. Thus, the size of an overlap zone may be changed one or more times to such that it is covered by the radiation pattern of the radar sensor.

In accordance with a still further aspect of the concepts, systems and methods described herein, in an automotive radar sensor, a blockage detection system and technique in which a result of an auto-alignment process is used as an input parameter to a blockage detection process.

In accordance with a still further aspect of the concepts, systems and methods described herein, in an automotive radar sensor, a system and technique for blockage detection which includes adapting an overlap zone such that the overlap zone is covered by an antenna radiation pattern (radar sight) of the radar sensor and a result of an auto-alignment function is used as an input parameter to the blockage detection process.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Figure 1:
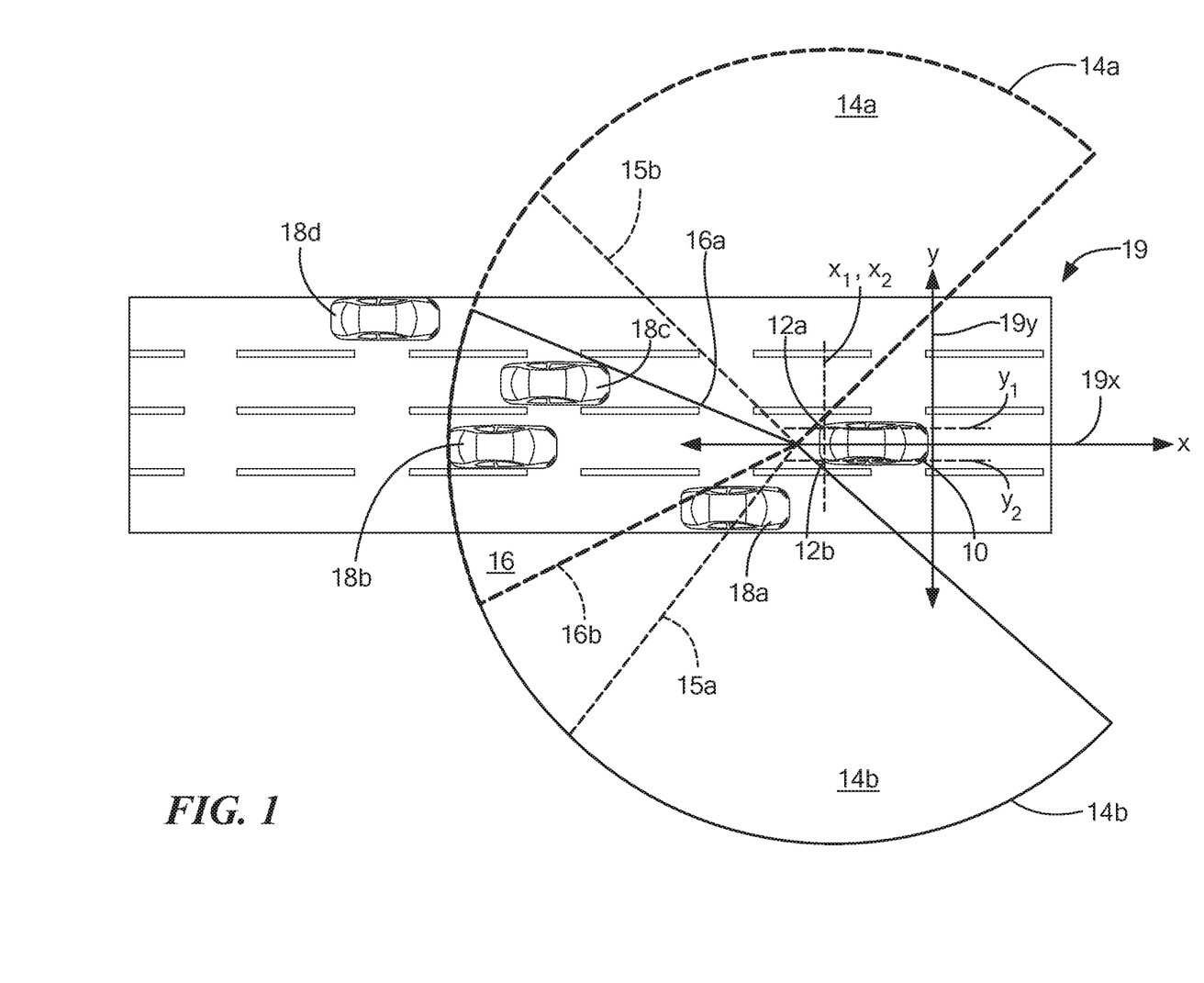
FIG. 1 is a diagram illustrating a vehicle radar sensing scenario within which features described herein may be practiced.

FIG. 1 is a diagram illustrating one example of a vehicle radar sensing scenario within which concepts, structures, and techniques sought to be protected herein may be practiced. As shown, a subject vehicle 10 is traveling along a roadway that may also be occupied by one or more other vehicles (or "target vehicles"), with four target vehicles 18a-18d (18 generally) shown in this example. The subject vehicle 10 is equipped within one or more radar sensors (generally denoted 12), with a first sensor 12a and a second sensor 12b shown in the example of FIG. 1.

The radar sensors 12 may be capable of sensing and tracking other vehicles 18 within the vicinity of subject vehicle 10. The sensors 12 may be capable of measuring, for example, the position (e.g., angle) and speed of the other vehicles. The sensors 12 may be coupled to other electronics within the subject vehicle 10 that allow the sensors 12 to warn the driver of the presence and location of other vehicles 18 about the subject vehicle 10 using, e.g., an audio or visual alert. In various embodiments, the radar sensors 12 track moving target vehicles 18 within one or more regions interest about the subject vehicle 10 using, for example, a Kalman filter or other tracking device for use in tracking targets. The tracking unit may track, for example, range, range rate, and azimuth angle of each detected target. The multiple sensors 12a, 12b may be inter-connected via one or more communication paths to share detection and tracking information, as discussed further below.

Each of the sensors 12a, 12b has a corresponding field-of-view (FOV) 14a, 14b (14 generally). A FOV 14 represents the region in which a sensor 12 can transmit and receive one or more radio frequency (RF) signals within transmit/receive beams established by respective ones of sensor transmit and receive antennas (which may be the same antenna or two separate antennas). If a target (e.g., a target vehicle 18) is present in a region covered by a transmit beam, a portion of the transmitted RF signal may be intercepted by a target and reflected back toward the sensor 12. The sensor 12 may then receive (e.g. via a sensor receive antenna) and analyze the so reflected energy (also referred to as "return energy") to determine information about the target.

Each of the sensors 12 may be mounted to the vehicle 10 at a respective position and angle ("mounting angle"). The sensor positions and mounting angles may be expressed in terms of a terms of a two-dimensional (2D) vehicle coordinate system 19 having x-axis 19x and y-axis 19y. In the example of FIG. 1, first sensor 12a has position $x_1$, $y_1$ and second sensor 12b has position $x_2$, $y_2$, where the sensor positions may be defined at some arbitrary point of the respective sensor. As shown more clearly in FIG. 1B, a sensor mounting angle (e.g., $\gamma_1$ or $\gamma_2$) may be expressed as an angle between the x-axis 19x and a line transverse the sensor. It should be appreciated that other schemes and coordinate systems may be used to define the sensor positions and mounting angles and that the concepts and techniques described herein are applicable to any coordinate system.

As shown in FIG. 1, the radar sensors 12a, 12b may be mounted on opposite sides of, and towards the rear of, vehicle 10. The mounting angles of sensors 12a and 12b may be chosen such that the respective field of FOVs 14a, 14b intersect to form a so-called "overlap zone" 16. In ideal embodiments, the sensors may be provided having a 180 degree FOV as indicated by dashed lines labelled 15a, 15b. In the example embodiment of FIG. 1, to promote clarity in the description of the concepts sought to be protected herein, the FOVs 14a, 14b of sensors 12a, 12b are each illustrated as being slightly less than 180 degrees. In certain embodiments, the sensors are provided having a nominal mounting angle of about thirty-seven (37) degrees. As used herein, the term "nominal" mounting angle" refers to an angle at which a sensor is designed or intended to be mounted on a vehicle using the coordinate system defined in FIG. 1B. The "real" mounting angle may deviate from the nominal mounting angle for various reasons, such as improper manufacture or installation or subsequent collisions or other impacts to the vehicle.

One or more of the radar sensors 12 are configured to detect the presence of a blockage, e.g., foreign matter that may block portions of the RF energy propagating to and from the transmit and receive antennas of a sensor. In various embodiments, the first and second radar sensors 12a, 12b cooperate to detect blockages by sharing information about detections within the overlap zone 16 (or, as explained below in conjunction with FIG. 1A, within an approximation of the overlap zone 16). For example, the sensors 12 may detect blockages by sharing and comparing detection information for target vehicles 18b and 18c, which are substantially within the overlap zone 16 as show.

Figure 1A:
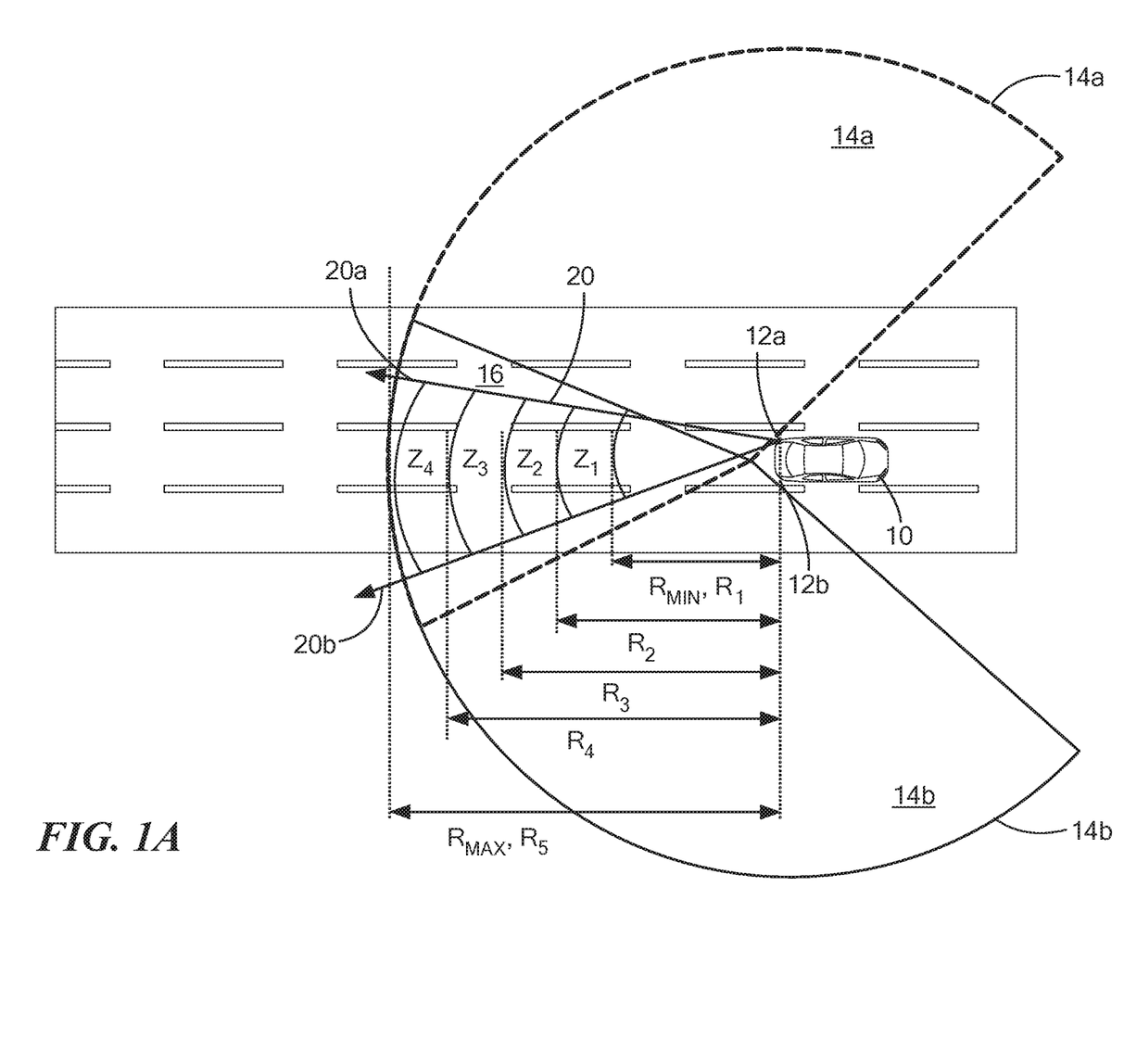
FIG. 1A is a diagram illustrating an overlap zone as sensed by a single radar sensor.

Referring to FIG. 1A, in which like elements of FIG. 1 are shown having like reference designations, the actual overlap zone 16 formed by two overlapping sensor FOVs 14a and 14b may be approximated by an individual one of those sensors 12a using a so-called "modified overlap zone."

Figure 1B:
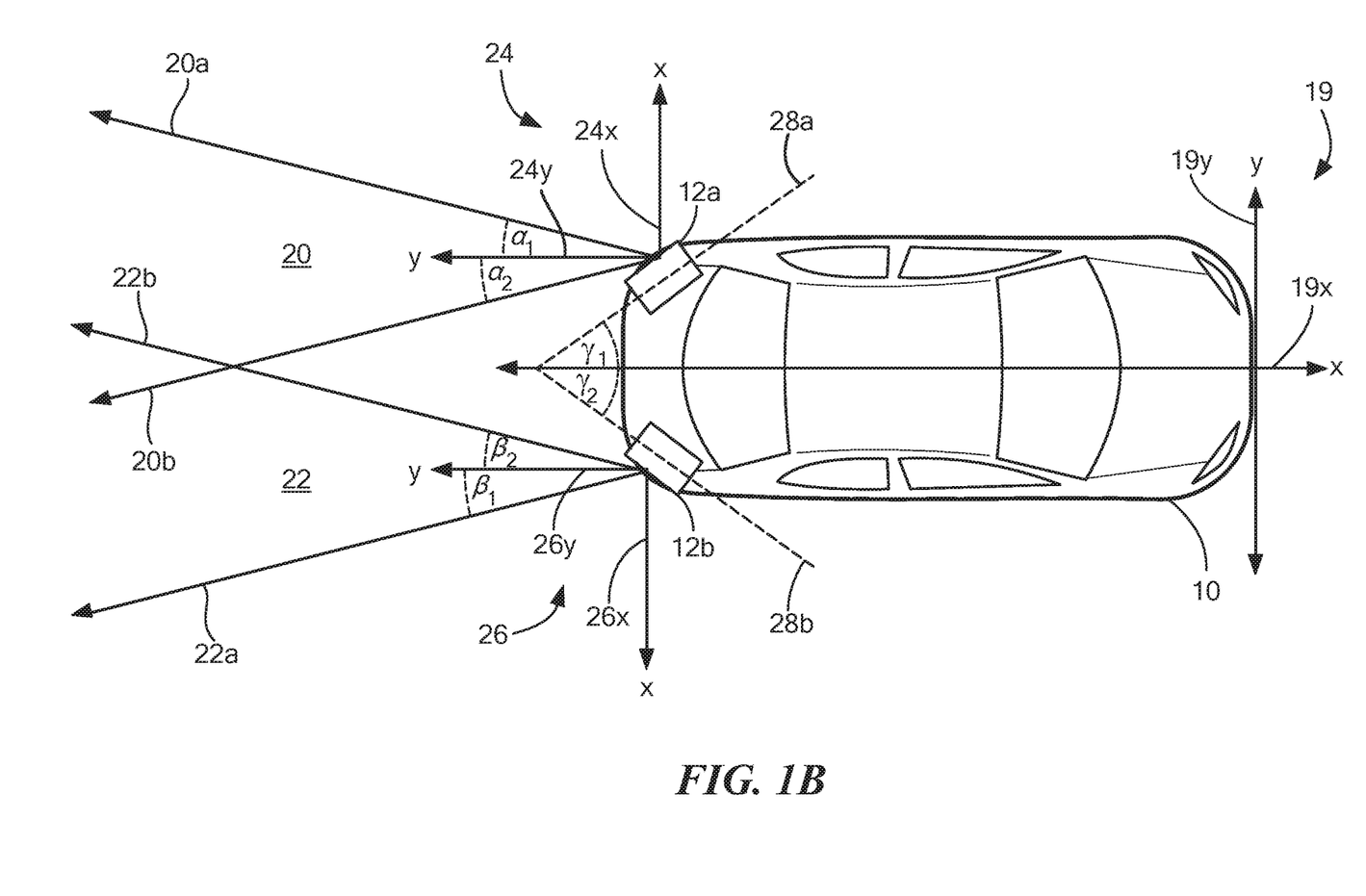
FIG. 1B is a diagram illustrating different coordinate systems that may be used within a vehicle radar system.

As seen in FIG. 1A, radar sensor 12a may use a modified overlap zone 20 having a generally conical shape defined by lateral borders 20a, 20b, a minimum range $R_{MIN}$, and a maximum range $R_{MAX}$. As shown in FIG. 1B and described below in conjunction therewith, the lateral borders 20a, 20b may be defined as angles within a coordinate system that is local to the sensor (referred to herein as the "sensor coordinate system"). To promote clarity in the drawing, the modified overlap zone for sensor 12b is not shown in FIG. 1A. In addition, the target vehicles 18 shown in FIG. 1 are omitted from FIG. 1A for clarity.

The sensor 12a can use the lateral borders 20a and 20b of the modified overlap zone 20, along with the minimum and maximum ranges $R_{MIN}$, $R_{MAX}$ to determine if a given radar detection is associated with the modified overlap zone 20. For example, the sensor 12a can compare range and azimuth angle information for each detected target to determine if the target (and, likewise, a track) is associated with the modified overlap zone 20.

In some embodiments, the modified overlap zone 20 may be divided into a plurality of sub-zones (e.g. N sub-zones) defined in terms of ranges from the sensor 12a. In the example shown, the modified overlap zone 20 is divided into four (4) sub-zones $Z_1$, $Z_2$, $Z_3$, and $Z_4$. It should, of course, be appreciated that any number of sub-zones may be used. In this example, sub-zone $Z_1$ begins at range $R_1$, sub-zone $Z_2$ begins at range $R_2$, sub-zone $Z_3$ begins at range $R_3$, and sub-zone $Z_4$ begins at range $R_4$. Each sub-zone has a common maximum range here illustrated as $R_5$. In such embodiments, the sensor 12a can use lateral borders 20a and 20b of the modified overlap zone 20, along with the various defined ranges $R_1$, $R_2$, etc. to determine if a detection is associated with a particular overlap sub-zone (e.g., $Z_1$, $Z_2$, etc.).

Sub-zones $Z_1$-$Z_4$ may be used for blockage detection. For example, considering first sub-zone $Z_1$, (which is the largest sub-zone in this example) detections and tracks outside this zone are filtered out and detection rate, number of tracks and number of events are evaluated.

The same processing may then be performed on sub-zones 2 and 3 and 4 (i.e. $Z_1$-$Z_4$) consecutively. Upon completion of such processing, detection rate, number of tracks and number of events for the four (or N) zones is provided.

At a predetermined period of time (sometimes referred to as an "evaluation moment" or a "status evaluation") during a blockage detection process, the conditions are evaluated.

In embodiments, an evaluation moment may occur at 300 seconds tact time and a blockage detection process evaluates conditions.

In an illustrative embodiment, if a detection rate is less than about thirty percent (30%), the number of tracks is greater than a first threshold value (e.g. ten (10) tracks) and the number of events is greater than a second threshold value (e.g. two-hundred (200) events) in any zone, then a blockage condition is deemed to exist (e.g. a blockage state is set to a logical TRUE value). It should be appreciated that the particular value to use for the first and second threshold values may be selected to fit the needs of the particular application.

Also in an illustrative embodiment, when the blockage state is a logical value of TRUE (i.e. a blockage is deemed to exist) and the system is at an evaluation moment, then if a detection rate is greater than about seventy percent (70%), a number of tracks is equal to a third threshold value (e.g. ten (10) tracks) and a number of events is greater than a fourth threshold value (e.g. two hundred (200) events) in all zones, then a blockage condition is deemed to not exist (e.g. a blockage state is then set to a logical value of FALSE). It should be appreciated that in some embodiments the first and third threshold values may be equal and the second and fourth threshold values may be equal. In other embodiments, the first, second, third and fourth threshold values may all differ. In still other embodiments, some of the threshold values may differ and some may be the same.

In short, the purpose of sub-zones is that the system should be able to trigger blockage if the sensor is partially shadowed by snow or mud by an amount such that detections on far range are lost. And, of course, it must be ensured that the sensor for blockage deactivation was correctly addressed (e.g. cleaned in the event a sensor is partially shadowed by snow or mud) to see the far range tracks and detections.

As mentioned above, the first and second radar sensors $12a$, $12b$ may cooperate to detect blockages by sharing and comparing information about detections made by the different sensors. For example, referring to FIG. 1A, both sensors $12a$, $12b$ may detect and track targets (e.g., a target vehicle 18 in FIG. 1) within their respective FOV $14a$, $14b$ and maintain one or more tracked object lists based thereon. The tracked object lists may include, for example, lists of raw detections (i.e., radar plots) and/or lists of tracks generated by a tracking device. A "raw detection" or "detection" may include azimuth and range, and the time the detection was made as determined by the sensor that made the detection. A "track" may include additional information about a target, such as the target's rate range and direction. As will become apparent from the description provided hereinbelow, in an embodiment, a filtered raw object list is sent between sensors and blockage detection processing is performed by comparing a sensor's own overlap zone filtered track object list with synchronized filtered raw object lists from one or more other sensors.

Thus, in this particular example, the second sensor $12b$ generates one or more filtered, raw object lists and may periodically send one or more of its (preferably synchronized) filtered raw object lists to the first sensor $12a$ using a communication path provided therebetween. In embodiments, a "filtered raw object list" corresponds to a raw object list which has been processed or filtered to identify which detections/tracks are "relevant" to blockage detection (where the term "relevant detection/track" is used to refer to a track or detection associated with an overlap zone between two or more sensors). Referring to the example of FIG. 1A, the second sensor $12b$ may filter the raw object list to include only detections/tracks associated with modified overlap zone 20 (as defined by lateral borders $20a$, $20b$ and ranges $R_{MIN}$, $R_{MAX}$). Sensor $12b$ may then synchronize the filtered raw object list to provide a resultant synchronized filtered raw object list which may then be provided to the first sensor $12a$. Similarly, the first sensor $12a$ may generate and periodically send one or more of its synchronized, filtered raw object lists to the second sensor $12b$. Significantly, the filtered raw object list sent by the second sensor $12b$ is synchronized with the first sensor $12a$. Such synchronization may be performed either before or after one or more filtered raw object lists are sent. Thus, such synchronization may be performed at either of the first or second sensors $12a$, $12b$. In terms of synchronization, the detections within the filtered raw object list may be adjusted, for example, to compensate for a time difference between the two sensors $12a$, $12b$. As another example, the sent object list may be transformed from a coordinate system used by the second sensor $12b$ into a coordinate system used by the first sensor $12a$. Such coordinate system transformations are described further below in conjunction with FIG. 1B. Other synchronization may also be performed.

Once the first sensor $12a$ has a synchronized, filtered raw object list from another sensor (e.g. sensor $12b$), the first sensor $12a$ may perform blockage detection by comparing sensor $12a$'s own overlap zone filtered track object list with the now synchronized filtered raw object lists. For example, the first sensor $12a$ may attempt to associate each relevant object from the second sensor $12b$ with a corresponding entry in the overlap zone filtered track object list of the first sensor $12a$ (e.g., based on detection time, azimuth angle, and/or range). The failure to find corresponding entries may indicate that the first sensor $12a$ has a blockage. It should be appreciated that the second sensor $12b$ can likewise detect blockages using a synchronized filtered raw object list received from the first sensor $12a$.

In some embodiments, blockage detection may be active only when suitable operating conditions exist, for example, if the vehicle 10 is traveling at a speed greater than some predetermined threshold (sometimes referred to as the "activation speed"). In one example, the activation speed is about two (2) meters per second (m/s).

In certain embodiments, the sensor $12a$ may calculate a so-called "detection rate" ($\beta$) and use this calculated value to determine when a blockage should be declared (e.g., when a blockage alert should be presented to a driver). For example, a blockage alert may be activated if the detection rate is less than a first threshold ($\beta<\beta_{act}$) and subsequently deactivated if the detection rate exceeds a second threshold ($\beta>\beta_{deact}$). In some embodiments, $\beta_{act}$ is between 20%-70% (and nominally 30%) and/or $\beta_{deact}$ is between about 60%-90% (and nominally 70%).

In some embodiments, sensor $12a$ may calculate detection rate ($\beta$) as follows:

$$\beta = \frac{\text{hits}}{\text{hits} + \text{misses}} \qquad \text{Equation (1)}$$

where "hits" correspond to the number of relevant detections/tracks received from the second sensor $12b$ for which the first sensor $12a$ has a corresponding detection/track, and "misses" correspond to the number of relevant detections/tracks received from the second sensor $12b$ for which the first sensor $12a$ does not have a corresponding detection/ track. In some embodiments, the blockage state (i.e., "activated" or "deactivated") may be re-evaluated periodically (e.g., every 300 milliseconds).

Referring to FIG. 1B, in which like elements of FIGS. 1 and 1A are shown using like reference designators, the concepts and techniques sought to be protected herein may make use of various coordinate systems defined within a vehicle radar system. In the embodiment shown, the nominal mounting angles for a first radar sensor 12a may be defined in terms of vehicle coordinate system 19. For example, the nominal mounting angle $\gamma_1$ for first sensor 12a may be defined as the angle between the vehicle x-axis 19x and a line 28a transverse of the sensor 12a. Likewise, the nominal mounting angle $\gamma_2$ for second sensor 12b may be defined as the angle between x-axis 19x and a line 28b transverse of the sensor 12b. In some embodiments, the lines 28a, 28b may be parallel to the radiating surfaces of respective sensors 12a, 12b. In some embodiments, nominal mounting angle $\gamma_1$ is about +37 degrees and nominal mounting angle $\gamma_2$ is about −37 degrees.

In addition to the vehicle coordinate system 19, a local coordinate system may be defined for each sensor 12. As shown, a first sensor coordinate system 24 having x-axis 24x and y-axis 24y may be defined for first sensor 12a, and a second sensor coordinate system 26 having x-axis 26x and y-axis 26y may be defined for second sensor 12b. Target detections/tracks generated by a sensor (e.g., sensor 12a) may be expressed in terms of that of that sensor's local coordinate system (e.g., coordinate system 24). As described above, sensors 12a, 12b may perform blockage detection in a decentralized manner (e.g. without the use of a centralized controller) using detection/track information received from another sensor.

To perform blockage detection, the first sensor 12a may define a modified overlap zone 20 having lateral borders 20a, 20b defined as angles $\alpha_1$, $\alpha_2$ relative to its local coordinate system, such as in the example shown. Likewise, the second sensor 12b may define a modified overlap zone 22 having lateral borders 22a, 22b defined as angles $\beta_1$, $\beta_2$ from its local coordinate system 26. In certain embodiments, the modified overlap zone lateral borders 20a, 20b, 22a, 22b may each be defined by an initial angle of about +/−10 degrees (e.g., $\alpha_1 \cong \beta_1 \cong 10°$ and $\alpha_2 \cong \beta_2 \cong -10°$).

Part of this synchronization process may include transforming detections/tracks from the second sensor coordinate system 26 into the first sensor coordinate system 24 (or vice-versa). Alternatively, the second sensor 12b may be configured to transform its detections/tracks from its local coordinate system 26 into the vehicle coordinate system 19 before sending them to the first sensor 12a, and the first sensor 12a may be configured to transform the received detections/tracks from the vehicle coordinate system 19 into its local coordinate system 24. In certain embodiments, transforming between coordinate systems is based on adding or subtracting values stored within a sensor's parameter file.

It is appreciated herein that correctly identifying detections/tracks as "relevant" for the purpose of blockage detection is dependent on the amount of deviation between the sensor's nominal and real mounting angles. For example, if the real mounting angle of first sensor 12a deviates too much from its nominal mounting angle $\gamma_1$, then the "actual" overlap zone defined by the overlapping sensor FOVs (e.g., FOVs 14a, 14b shown in FIG. 1A) will change. As a result, the first sensor 12a may incorrectly identify detections/tracks received from second sensor 12b as being relevant when in fact those detections/tracks are outside the first sensor's FOV, leading to false blockage detections/alerts.

Figure 1C:
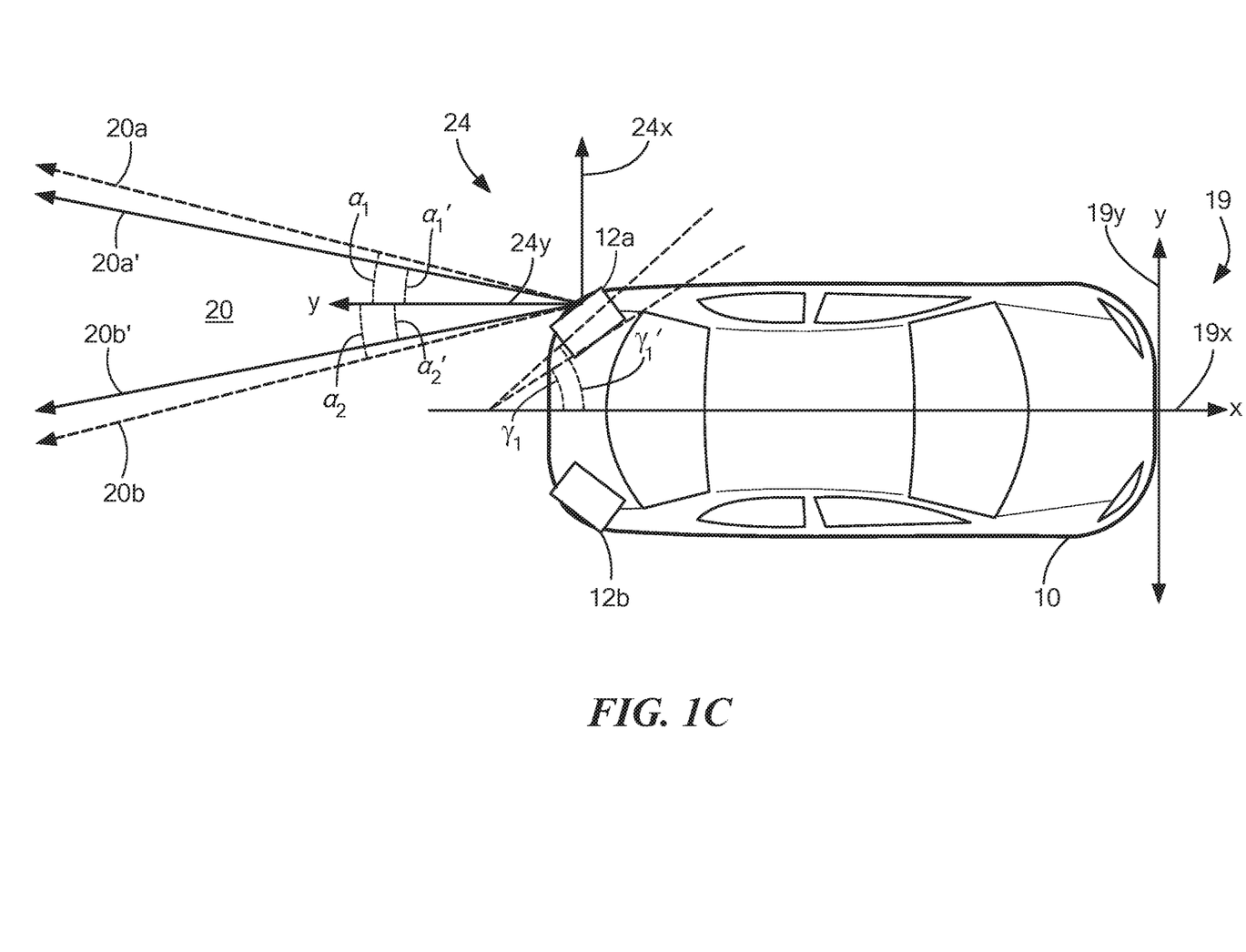
FIG. 1C is a diagram illustrating a radar sensor's real mounting angle deviating from its nominal mounting angle.

Referring to FIG. 1C, in which like elements of FIGS. 1, 1A, and 1B are shown using like reference designators, in various embodiments, a radar sensor 12 may utilize a so-called "auto-alignment" technique to improve the accuracy of blockage detection. In the example shown, first sensor 12a may have nominal mounting angle $\gamma_1$ and real mounting angle $\gamma_1' < \gamma_1$. Prior to performing blockage detection (or as part of the blockage detection process), the sensor 12a may perform the auto-alignment process to estimate the real mounting angle $\gamma_1'$. After estimating the real mounting angle $\gamma_1'$, the sensor 12a may adjust the lateral borders of its modified overlap zone 20 to compensate for the change in the actual overlap zone defined by the overlapping sensor FOVs (e.g., FOVs 14a, 14b shown in FIG. 1A) and, thus, avoid false blockage detections/alerts. For example, as shown in FIG. 1C, after estimate its real mounting angle $\gamma_1' < \gamma_1$, the sensor 12a may adjust a first lateral border from slope 20a defined by angle $\alpha_1$ to slope 20a' defined by $\alpha_1' < \alpha_1$, and may adjust a second lateral border from slope 20b defined by angle $\alpha_2$ to slope 20b' defined by $\alpha_2' < \alpha_2$. In this example, the size of the modified overlap zone 20 is decreased in response to an increase in the sensor mounting angle. To determine how much to change the lateral borders for a given mounting angle deviation, in one embodiment, if the mounting angle is less than thirty-sevens degrees (37°), then the zone will shrink substantially linearly to the estimated auto alignment angle. Thus, if 37>gamma from auto alignment, then (Min rad) alpha2_new=alpha2_old+(37-gamma from auto alignment1) and (Max rad) alpha1_new=alpha1_old+(−37+gamma from auto alignment1). Otherwise, if 37<=gamma, (Min rad) alpha2_new=alpha2_old and (Max rad) alpha1_new=alpha1_old.

In some embodiments, the sensor 12a may adjust its modified overlap zone 20 if the estimated mounting angle is less than a predetermined adjust threshold ($\gamma_1' < \Gamma_{ADJ}$). If the estimated mounting angle is greater than or equal to the adjust threshold ($\gamma_1' \geq \Gamma_{ADJ}$) then the initial/default values any be used for the overlap zone lateral borders (e.g., slopes 20a, 20b in FIG. 1C).

In certain embodiments, the sensor 12a may disable blockage detection if the real sensor mounting angle is estimated to be below a predetermined minimum threshold ($\gamma_1' < \Gamma_{MIN}$). In one example, blockage detection may be disabled if the estimated mounting angle is less than about thirty (30) degrees (e.g., $\gamma_1' < \Gamma_{MIN} \cong 30°$).

Any suitable auto-alignment process (sometimes referred to as a "self-calibration" process) may be used to estimate the sensor's mounting angle $\gamma'$. In some embodiments, the auto-alignment process can estimate the real mounting angle with an accuracy of +/−1.5 degrees. In various embodiments, a sensor 12 is configured to perform an auto-alignment process similar to one described in U.S. Patent Publication 2015/0070207, entitled "Method and Apparatus For Self Calibration of A Vehicle Radar System," which is herein by incorporated by reference in its entirety.

Figure 2:
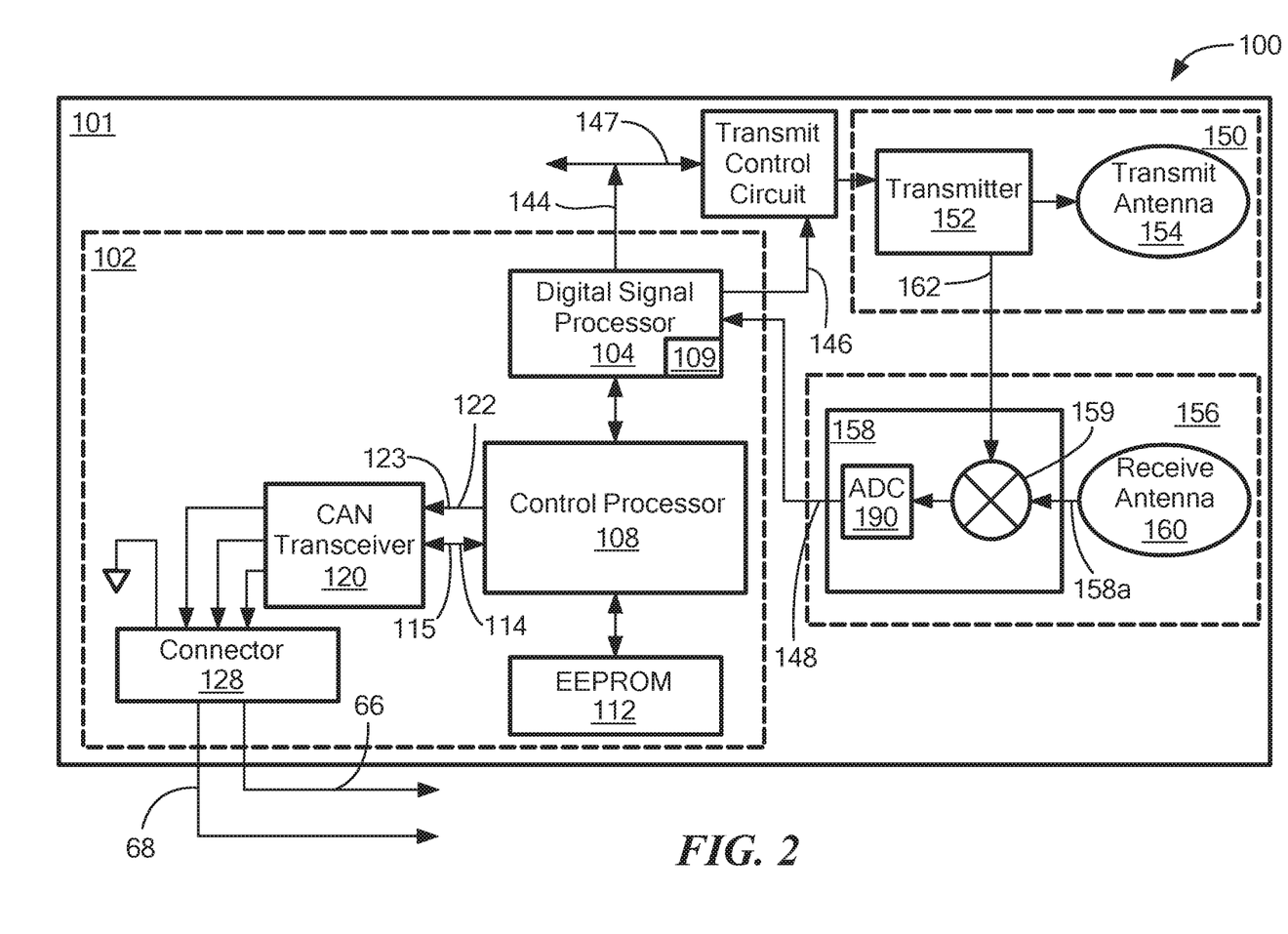
FIG. 2 is a block diagram of a side object detection (SOD) system for use in a vehicle radar system.

Referring to FIG. 2, a side-object detection (SOD) system 100 which may be the same as or similar to radar sensors 12a, 12b described above in conjunction with FIGS. 1 and 1A-1C, and capable of performing blockage detection, includes a housing 101 having a plurality of circuit boards 102, 150, 156 (shown in phantom) disposed therein. It should be appreciated that while a single circuit board or any number of circuit boards can be used, in this illustrative embodiment, three circuit boards are used and the particular type of material from which each circuit board is provided is selected to satisfy all circuit performance and cost requirements. For example, circuit board 102 may be provided as a fiberglass circuit board; circuit board 150 may be provided as a low temperature co-fired ceramic (LTTC) circuit board or as a polytetrafluoroethylene (PTFE) circuit board 150; and circuit board 156 may be provided as an LTCC circuit board 156. Other materials may also be used for each circuit board as long as circuit performance and cost criteria are satisfied. Those of ordinary skill in the art will understand how to select the number of circuit boards as well as a particular material for each circuit board depending upon a variety of factors including but not limited to technical (e.g., engineering) requirements and cost.

The circuit board 102 has disposed thereon a digital signal processor (DSP) 104 coupled to a control processor 108. The DSP 104 may include a blockage detection processor 109 configured to perform one or more of the blockage technique techniques described herein (e.g., process 300 of FIG. 3 and/or process 400 of FIG. 4).

The control processor 108 is coupled to a memory 112 which is here illustrated as an electrically erasable read-only memory (EEPROM) 112. Other types of memory may also be used. Memory 112 is adapted or configured to retain a variety of values including but not limited to calibration values. For example, control processor 108 may receive calibration parameters related to counter and timer settings from memory 112 for use in determining whether a blockage condition exists. Other memories, including other read only memories, associated with processor program memory are not shown for clarity. The control processor 108 is coupled to a CAN transceiver 120, which is adapted or configured to communicate, via a connector 128, with a CAN bus 66 which may be coupled to a second sensor and thus may be referred to as a second sensor CAN bus.

The control processor 108 is also configured to perform digital functions, for example, to identify conditions under which an operator of a vehicle on which the SOD system 100 is mounted should be alerted to the presence of another object such as a vehicle in a blind spot.

In some embodiments, a blockage alert signal 115 can be provided to a CAN transceiver 120. Blockage alert signal 115 can be electrically coupled to an icon which turns on to alert a driver to a blockage condition. Alternatively or additionally, blockage alert signal 115 may propagate on the CAN bus and can be electrically coupled to a screen display (e.g. a scrolling screen display) to alert a driver to a blockage condition. In other embodiments, the sensor 100 may also include an HMI driver and an HMI bus along which signals may propagate.

In various embodiments, the SOD system 100 can communicate with other SODs via the CAN bus 66. For example, the SOD system 100 may transmit/receive target object lists to/from another SOD mounted on the same vehicle as SOD system 100.

The human/machine interface (HMI) bus and any associated driver may include any form of communication media and communication format, including, but not limited to, a fiber optic media with an Ethernet format, and a wire media with a two-state format.

Sensor 100 further includes a radar transmitter 152 coupled to a transmit antenna 154. Transmitter 152 is also coupled to DSP 104 through a transmit control circuit, an interface 147 and a bus 144. In one embodiment, the interface 147 may be provided as a serial port interface (SPI) 147.

The sensor further includes a receive antenna 160 coupled to a receiver 158. Receiver 158 includes an analog-to-digital converter (ADC) 190. Receiver 158 may optionally also include an event generator which may be the same as or similar to the type described in PCT Application PCT/US2007/023019 published in the English Language on May 29, 2008 as WO 2008/063367. Receiver 158 is, in turn, coupled to the DSP 104 and to the transmitter 152. In some embodiments, the receiver 158 may also be coupled to the DSP 104 through one or more signal paths. The radar transmitter 152 and the radar receiver 158 may receive regulated voltages from a voltage regulator. The transmitter 152 may also provide RF signals to receiver 158 and, in particular to a frequency downconverter circuit 159 through a signal path 162.

In operation, the DSP 104 initiates one or more chirp control signals (also referred to as ramp signals) by providing a command signal to a transmit control circuit via signal path 146. In response to the command signal from the DSP, the transmit control circuit generates chirp control signals. In embodiments, an event generator may be used to thus remove the chirp control signal processing function from the DSP 104. In embodiments, the chirp generator may be located in the transmit control circuit, transmitter 152 or receiver 158.

Each chirp control signal has a start voltage and an end voltage. The chirp control signal is provided to a signal source. In response to the ramp signals, the signal source generates RF signals having waveform and frequency characteristics determined or controlled by the chirp control signal. The transmitter feeds or otherwise provides the RF signals to the transmit antenna 154 which emits (or radiates) the RF signals as RF chirp radar signals. As used herein, the term "chirp" is used to describe a signal having a characteristic (e.g., frequency, amplitude, or any other characteristic or combinations of any characteristics) that varies with time during a time window. Typically, in those instances when the frequency of the signal is varied, each chirp has an associated start and end frequency. A chirp may be a linear chirp, for which the frequency varies in a substantially linear fashion between the start and end frequencies. The chirp may also be a non-linear chirp.

The DSP 104 initiates transmission of ramp signals so-called major cycles. In embodiments, DSP 104 may initiate a pre-programmed set of actions, which will cause a signal source (e.g., a voltage-controlled oscillator or VCO) to be modulated accordingly, for each minor cycle in turn. A major cycle is a time period during which signals are received in a designated set of the receive beams (e.g., all receive beams or less than all of the receive beams). A major cycle is comprised of one or more so-called minor cycles. A minor cycle is a period of time during which signals are received in a subset (e.g. one or more) of the designated set of receive beams.

As mentioned above, the DSP 104 initiates one or more signals for each minor cycle. Thus, for each major cycle, the DSP may issue a so-called "go" command several times per major cycle. In response, controls signals or values in each minor cycle including the transmission of the ramp control signals (or more simply "ramp signals") in each minor cycle are provided.

The transmit antenna 154 may be provided having one or a plurality of transmit beams. Regardless of the particular number of transmit beams, the transmit antenna 154 emits one or more RF chirp radar signals in one or more desired fields of view. The transmit beams may be similar or different in antenna pattern and may be similar or different in fields of view. The fields of view of the transmit beams may overlap to varying extents, from completely overlapped to not at all overlapped.

The receive antenna system 160 may utilize one or a plurality of receive beams. The receive beams may be similar or different in antenna pattern and may be similar or different in fields of view. Like the transmit beams, the fields of view of the receive beams may overlap to varying extents, from completely overlapping to not overlapping at all.

Each of the receive beams receives return or echo radar signals, or otherwise generates and/or receives noise signals. Signals received through the receive beams are coupled to radar receiver 158. Radar receiver 158 receives the RF signals provided thereto from the antenna, down converts the received RF signals to an intermediate frequency (IF) signal via downconverter 159, and provides an output signal on signal path 148. In addition to the frequency down conversion, the receiver 158 appropriately processes the RF input signals provided thereto from the receive antenna system 160 such that the output signals on the signal path 148 can be appropriately received and processed by the DSP 104 (e.g. via analog-to-digital converter 190).

The signal provided to the input of DSP 104 has a frequency content, wherein signal level peaks which occur at different frequencies correspond to detected objects at different ranges. The DSP 104 analyzes the signals provided thereto and identifies objects in a detection zone.

Some objects identified by the DSP 104 may be objects for which an operator of the subject vehicle has little concern and need not be alerted. For example, an operator of vehicle may not, in some instances, need to be alerted or continuously alerted as to the existence of a stationary guardrail along the roadside. Thus, criteria additional to the presence of an object in or near the detection zone may be used to determine when an alert signal should be generated or terminated.

To utilize further criteria, the control processor 108 receives object detections on a signal path (e.g. a bus) 106 from the DSP 104. The control processor 108 applies a series of factors and characteristics (i.e., criteria used in addition to that used by DSP 104 to identify an object) to control generation of an alert signal and/or a blockage detection signal once the blockage state is determined in the DSP 104, the blockage state is sent (e.g. via an SPI) to a control processor which may output the blockage state (e.g. to the private CAN bus).

In alternate embodiments, upon determination by the control processor 108, an alert signal or a blockage detection signal may be generated and sent through a bus 114 to CAN transceiver 120 and communicated on the CAN bus 66 (e.g. a second sensor CAN bus).

In the case of an alert signal, the signal is indicative not only of an object in the detection zone, but also is indicative of an object having predetermined characteristics being in the detection zone. In other embodiments, an alert signal may be communicated by control processor 108 on a bus 122 a vehicle CAN bus 68. In the case of a blockage detection signal, the signal may be indicative of the existence or the potential existence of a blockage which undesirably blocks portions of the RF energy propagating to and from the transmit and/or receive antenna of the SOD thereby affecting the effectiveness of the SOD system 100.

In embodiments, it is known, for example, that fiberglass circuit boards have acceptable signal carrying performance at signal frequencies up to a few hundred MHz. LTCC circuit boards and PTFE circuit boards are known to have acceptable signal carrying performance characteristics at much higher frequencies. Thus, in the case where circuit board 102 is provided as a fiberglass circuit board and circuit boards 150, 156 are provided from LTCC and/or PTFE, circuits and circuitry which perform the lower frequency functions of the SOD system 100 are disposed on the circuit board 102, while circuits and circuitry which perform the functions having relatively high frequencies (e.g. above approximately 2 GHz) are disposed on the LTCC and on the PTFE circuit boards 150, 156, respectively. Nevertheless, suitable materials other than those specifically mentioned herein may be used.

Figure 3:
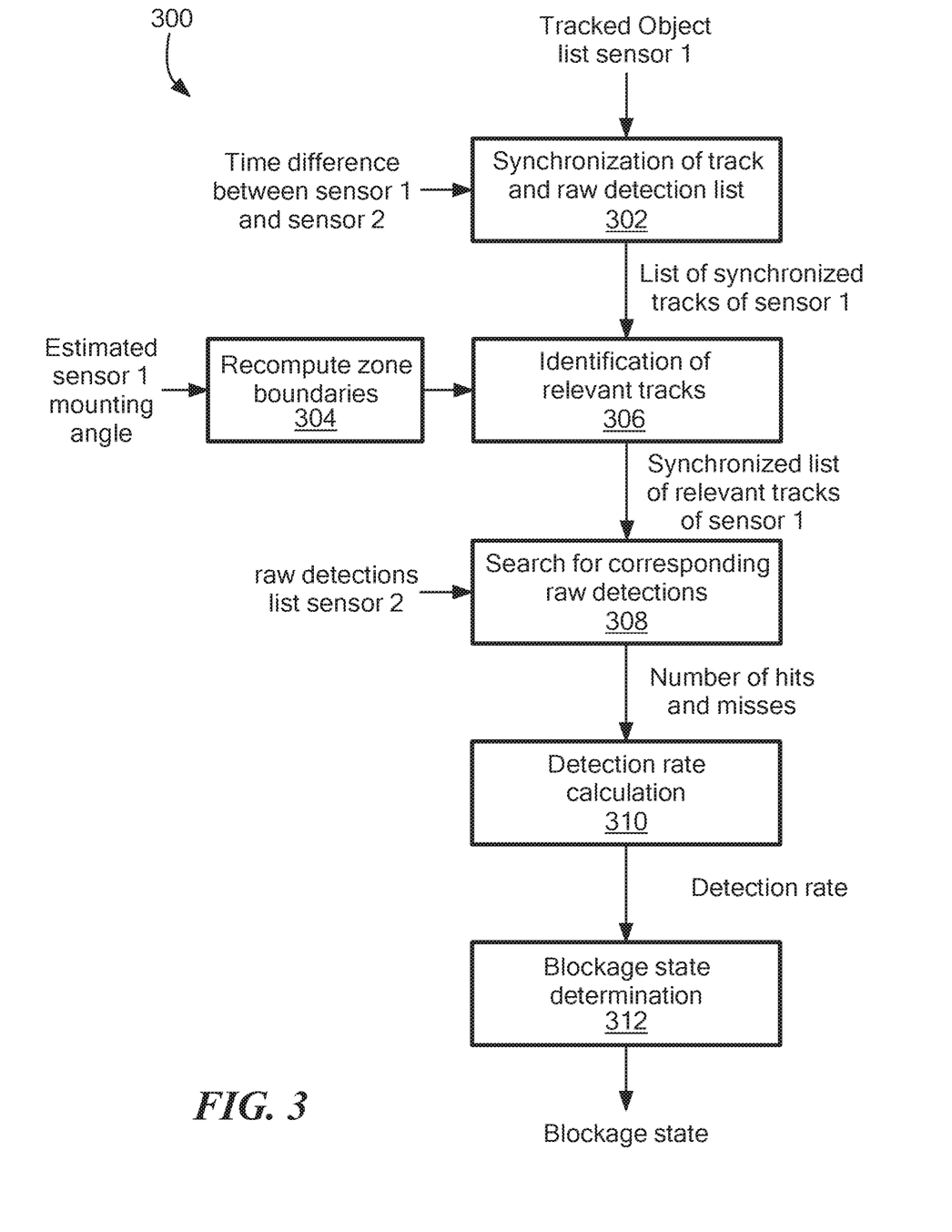
FIGS. 3 and 4 are flow diagrams illustrating processing that may occur within a vehicle radar system.
Figure 4:
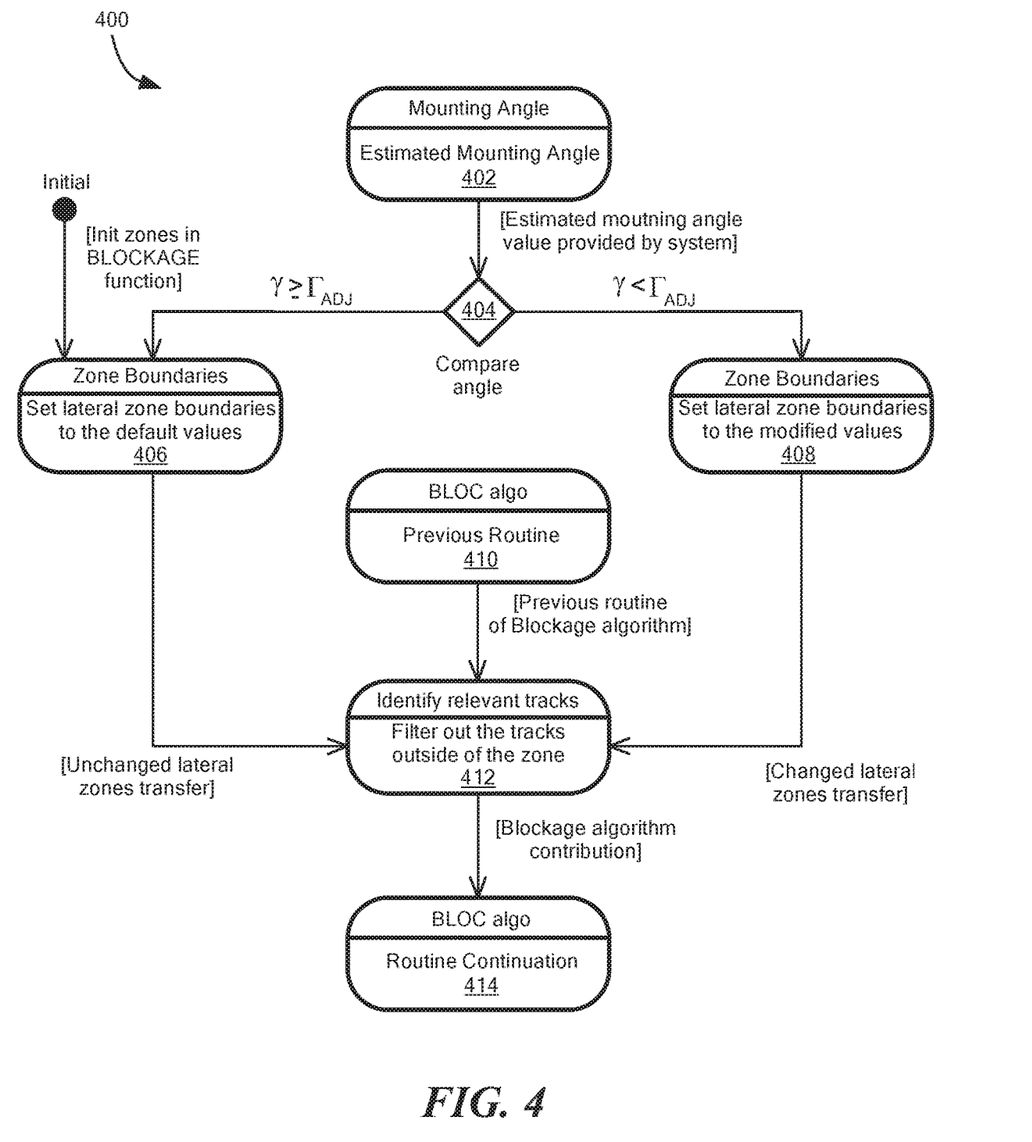

FIGS. 3 and 4 are flow diagrams showing illustrative processing that can be implemented within a radar sensor (e.g., within a radar sensor 12 shown in FIG. 1 and/or within the SOD system 100 of FIG. 2). Rectangular elements (typified by element 302 in FIG. 3), herein denoted "processing blocks," represent computer software instructions or groups of instructions. Diamond shaped elements (typified by element 404 in FIG. 4), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order. It should be appreciated that the process is executing in both sensors separately (i.e. both sensors are evaluating blockage of each other). That is, a first sensor (e.g. sensor 1) is evaluating blockage of a second sensor (e.g. sensor 2) and vice versa.

Referring now to FIG. 3, a process 300, begins at block 302, where a first sensor ("sensor 1") receives and synchronizes a raw detection list from second sensor ("sensor 2"). Synchronization may include adjusting the received tracked object list to adjust for a spatial difference in sensor coordinate systems between the first and second sensor's (e.g., between sensor coordinate systems 24, 26 shown in FIG. 1B). Each sensor has independent counter and thus the values between two (or more) sensors can be different.

At block 304, lateral borders of the second sensor's modified overlap zone may be adjusted based on an estimate of the first sensor's real mounting angle. In embodiments, sensor 1 utilizes an auto alignment angle.

The first sensor's real mounting angle may be estimated using an auto-alignment process. In some embodiments, block 304 may utilize processing described below in conjunction with FIG. 4.

At block 306, the synchronized tracked object list may be filtered to identify relevant detections/tracks based on the adjusted lateral borders of the second sensor's modified overlap zone. At block 308, the second sensor attempts to associate each relevant detection/track received from the first sensor with a corresponding detection/track made by the second sensor. Based on the number of successful and unsuccessful associations, a detection rate ($\beta$) may be calculated at block 310. In certain embodiments, the detection rate may be calculated using Equation (1) shown above.

At block 312, a blockage state (e.g., "active" or "inactive") may be determined using, for example, the calculated detection rate ($\beta$). In some embodiments, a blockage alert may be activated if the detection rate is less than a first threshold ($\beta<\beta_{act}$) and subsequently deactivated if the detection rate exceeds a second threshold ($\beta>\beta_{deact}$).

Referring to FIG. 4, a process 400, begins at block 402 where a sensor's real mounting angle ($\gamma'$) is estimated using an auto-alignment process, such as a process described in U.S. Patent Publication 2015/0070207. At block 404, if the estimated mounting angle $\gamma'$ is greater than a predetermined adjust threshold ($\gamma' \geq \Gamma_{ADJ}$) then blockage detection may proceed (blocks 410-414) using default/initial lateral borders defined for the sensor's modified overlap zone. If the estimated mounting angle $\gamma'$ is less than the adjust threshold ($\gamma'<\Gamma_{ADJ}$) then the lateral borders of the overlap zone may be adjusted (block 408) prior to continuing the blockage detection process. As noted above, the amount by which to change the lateral borders for a given mounting angle may be determined as follows: if 37>gamma (e.g. as determined from an auto alignment measurement), then (Min rad) alpha2_new=alpha2_old+(37-gamma from auto alignment1) and (Max rad) alpha1_new=alpha1_old+(−37+gamma from auto alignment1). However, if 37<=gamma (e.g. as determined from an auto alignment measurement), (Min rad) alpha2_new=alpha2_old and (Max rad) alpha1_new=alpha1_old.

In certain embodiments, blockage detection may be disabled if the estimated mounting angle is less than a predetermined minimum threshold ($\gamma'<\Gamma_{MIN}$). In one example, blockage detection may be disabled if the estimated mounting angle is less than about thirty (30) degrees (e.g., $\gamma'<\Gamma_{MIN}\cong 30°$).

It should be understood that process 400 of FIG. 4 may be performed in combination with process 300 of FIG. 3 to provide improved blockage detection in an automotive radar system.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method for detecting blockages in an automotive radar system having two or more radar sensors with overlapping field-of-views (FOVs), the method comprising:
receiving, at a first radar sensor, a synchronized, filtered, raw object list including detections for one or more targets made by a second radar sensor;
determining an estimated mounting angle of the first radar sensor using an auto-alignment process;
adjusting an overlap zone associated with the first radar sensor based on the estimated mounting angle of the first radar sensor;
generating an overlap zone filtered track object list using detections for one or more targets by the first radar sensor;
comparing the overlap zone filtered track object list of the first sensor with the synchronized filtered raw object lists from the second sensor; and
changing the size of an overlap zone in response to the compare step.

2. The method of claim 1 wherein changing the size of an overlap zone in response to the compare step comprises reducing the size of the overlap zone in response to the compare step.

3. The method of claim 1 wherein changing the size of an overlap zone comprises adaptively changing the size of the overlap zone in response to repeated comparisons of overlap zone filtered track object lists of the first sensor with the synchronized filtered raw object lists from the second sensor.

4. The method of claim 1 further comprising attempting to associate each relevant object in the synchronized, filtered, raw object list from the second sensor with a corresponding entry in the overlap zone filtered track object list of the first sensor.

5. The method of claim 1 wherein attempting to associate each relevant object from the second sensor with a corresponding entry in the overlap zone filtered track object list of the first sensor comprises associating each relevant object from the synchronized, filtered, raw object list of the second sensor with a corresponding entry in the overlap zone filtered track object list of the first sensor based on one or more of: detection time, azimuth angle, and/or range.

6. The method of claim 4 wherein the synchronized, filtered, raw object list of the second sensor is synchronized by transforming detections/tracks from a first coordinate system to a second coordinate system.

7. The method of claim 4 wherein the synchronized, filtered, raw object list of the second sensor is synchronized by at least one of azimuth angle, and/or range.

8. The method of claim 1 wherein adjusting the overlap zone includes adjusting one or more lateral borders associated with the overlap zone based on the estimated mounting angle of the first radar sensor.

9. The method of claim 1 wherein identifying one or more relevant detections/tracks from the raw object list includes identifying detections/tracks from the raw object list that have azimuth angles and ranges associated with the overlap zone.

10. The method of claim 1 wherein performing blockage detection includes performing blockage detection only if the estimated mounting angle of the first radar sensor is greater than a threshold value.

11. The method of claim 1 wherein performing blockage detection includes calculating a detection rate based on the number of relevant detections/tracks from the second radar sensor that are associated with detections/tracks for made by the first radar sensor.

12. The method of claim 11 wherein performing blockage detection further includes:
activating a blockage alert in the first radar sensor if the detection rate is less than a first threshold value; and
deactivating the blockage alert in the first radar sensor if the detection rate is greater than a second threshold value.

* * * * *